(12) United States Patent
Winter et al.

(10) Patent No.: US 7,617,964 B2
(45) Date of Patent: Nov. 17, 2009

(54) SOLDER COMPOSITIONS; METHOD OF SOLDERING, AND A LAMINATED TRANSPARENCY HAVING BUS BARS

(75) Inventors: John A. Winter, Pittsburgh, PA (US); Charles S. Voeltzel, New Kensington, PA (US); Cheryl E. Belli, New Kensington, PA (US); James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 384 days.

(21) Appl. No.: 11/638,961

(22) Filed: Dec. 14, 2006

(65) Prior Publication Data
US 2007/0152019 A1 Jul. 5, 2007

Related U.S. Application Data

(63) Continuation-in-part of application No. 10/652,405, filed on Aug. 29, 2003, now Pat. No. 7,159,756.

(51) Int. Cl.
*A47J 36/02* (2006.01)
*B60L 1/02* (2006.01)

(52) U.S. Cl. ............... 228/101; 228/122.1; 219/202; 219/203; 219/214; 219/219; 420/555; 420/89; 420/403; 420/470

(58) Field of Classification Search ............ 219/202–3, 219/214, 219; 228/101, 122.1; 420/555, 420/89, 403, 470
See application file for complete search history.

(56) References Cited

U.S. PATENT DOCUMENTS

| | | | |
|---|---|---|---|
| 4,401,609 A | 8/1983 | McGarry et al. | 264/11 |
| 4,587,769 A | 5/1986 | Cathers | 51/165.87 |
| 4,654,067 A | 3/1987 | Ramus et al. | 65/60.5 |
| 4,998,784 A | 3/1991 | Freeman et al. | 350/3.7 |
| 5,030,592 A | 7/1991 | Komarneni et al. | 501/9 |
| 5,040,411 A | 8/1991 | Medzius | 73/73 |
| 5,066,111 A | 11/1991 | Singleton et al. | 359/275 |
| 5,182,431 A | 1/1993 | Koontz et al. | 219/203 |
| 5,240,886 A | 8/1993 | Gulotta et al. | 501/70 |
| 5,492,750 A | 2/1996 | Shumaker, Jr. et al. | 428/192 |
| 5,523,162 A | 6/1996 | Franz et al. | 428/421 |
| 5,593,929 A | 1/1997 | Krumwiede et al. | 501/70 |

(Continued)

FOREIGN PATENT DOCUMENTS

DE 198 29 151 C1 2/2000

(Continued)

OTHER PUBLICATIONS

U.S. Appl. No. 09/591,572, filed Jun. 9, 2000.

(Continued)

*Primary Examiner*—Shawntina Fuqua
(74) *Attorney, Agent, or Firm*—Andrew C. Siminerio (57) ABSTRACT

A low temperature solder including indium in the range of 62-65 weight percent and tin in the range of 31-33 weight percent uses the heat generated during thermal treatment of one or more glass sheets to melt the solder. In one non-limiting embodiment, a lead providing external access to an electrical conductive arrangement, e.g. a conductive member between and connected to spaced bus bars between laminated sheets has an end portion of a connector, e.g. a lead soldered to each of the bus bars during thermal processing of the sheets, e.g. during the lamination of the sheets during a windshield manufacturing process. In another nonlimiting embodiment, the connector is soldered to the electrically conductive arrangement during the annealing of glass blanks following the heating and shaping of the glass blanks.

20 Claims, 3 Drawing Sheets

U.S. PATENT DOCUMENTS

| | | | |
|---|---|---|---|
| 5,655,282 A | 8/1997 | Hodek et al. | 29/469.5 |
| 5,656,055 A | 8/1997 | Frank et al. | 65/287 |
| 5,812,332 A | 9/1998 | Freeman | 359/894 |
| 5,861,606 A | 1/1999 | Castle et al. | 219/203 |
| 6,027,766 A | 2/2000 | Greenberg et al. | 427/226 |
| 6,253,988 B1 * | 7/2001 | Pereira | 228/122.1 |
| 6,535,126 B2 | 3/2003 | Lin et al. | 340/550 |
| 6,730,389 B2 | 5/2004 | Voeltzel | |
| 6,791,065 B2 | 9/2004 | Bartrug et al. | |
| 6,791,066 B2 | 9/2004 | Hawk | |
| 7,132,625 B2 | 11/2006 | Voeltzel | |

FOREIGN PATENT DOCUMENTS

| | | |
|---|---|---|
| EP | 0 385 791 | 9/1990 |
| EP | 00936375.5 | 5/2000 |
| EP | 00939609.4 | 6/2000 |
| WO | 00/58051 | 10/2000 |
| WO | 2003/074334 | 9/2003 |
| WO | 2004/009350 | 1/2004 |

OTHER PUBLICATIONS

Andreeva, L. I. et al, "Soldering for Soldering Components of Electrovacuum Devices," (1979).

* cited by examiner

SOLDER COMPOSITIONS; METHOD OF SOLDERING, AND A LAMINATED TRANSPARENCY HAVING BUS BARS

CROSS REFERENCE TO RELATED APPLICATIONS

This application is a continuation-in-part application of U.S. patent application Ser. No. 10/652,405 filed on Aug. 29, 2003 now U.S. Pat. No. 7,159,756, in the names of John A. Winter, Cheryl E. Belli, James P. Thiel and Charles S. Voeltzel for "Method of Soldering and Solder Compositions."

BACKGROUND OF THE INVENTION

1. Field of the Invention

This invention relates to solder compositions; a method of soldering, to make electrical connections, a laminated transparency having bus bars, and more particularly, to a solder having a low melting temperature so that the heat of a manufacturing process can be used to melt the solder, e.g. using the heat of a windshield laminating process to laminate two glass sheets together and to melt the solder.

2. Discussion of the Technical Problem and Available Solutions

In the manufacture of laminated transparencies, e.g. automotive windshields, having an electrically conductive member between laminated glass sheets, e.g. heatable coatings and/or antennas to transmit or receive signals, leads extend outward from between the laminated glass sheets to provide external electrical access to the conductive member. U.S. Pat. No. 5,861,606 ("Pat. '606") discusses a bus bar system having a plurality of spaced wires between and connected to a pair of spaced bus bars. Bus bars strips extend from the upper bus bar to the bottom portion of the windshield spaced from the electrically conductive wires and the bottom bus bar. End portions of the upper bus bar and upper end portions of bus bar strips are soldered together during autoclaving. One of the glass sheets of the windshield is provided with a recess to expose end portions of the lower bus bar and lower end portions of the bus bar strips. Leads are soldered to the lower bus bar and the bus bar strip prior to or after autoclaving.

A limitation of soldering leads in accordance to the method disclosed in Pat. '606 is the localized heating of the glass sheet during soldering. U.S. Pat. No. 6,253,988 ("Pat. '988") discusses the problems associated with localized heating of glass during soldering. More particularly, Pat. '988 discloses that solder typically used for soldering leads to contacts of an electrical component has a melting point of about 193° C. (380° F.) and, if resistance soldered, requires about 750-800 waft seconds of energy to melt the solder. During soldering, heat flows on the glass sheet in regions near the solder joint, and heat of this magnitude may be sufficient to cause damage to the glass sheet, e.g. initiate stresses in the glass during soldering due to temperature differences, which can cause glass chipping.

One technique to eliminate the localized heating discussed in Pat. '988 is to use the bus bar system disclosed in U.S. patent application Ser. No. 10/201,863 filed on Jul. 24, 2002, in the names of Bartrug et al. for "Edge Sealing of a Laminated Transparency" (hereinafter also referred to as "U.S. Ser. No. 10/201,863"). In general, the bus bar system includes a "T" shaped metal foil bus bar having one leg of the "T" extending beyond the laminated sheets, and the other leg of the "T" in electrical contact with the conductive member. The solution to eliminate localized heating provided by Pat. '988 is to solder at lower temperatures. More particularly, Pat. '988 discloses a solder having a solidus temperature of 118.5° C. (245.3° F.) and a liquidus temperature of 121.5° C. (250.7° F.). The solder can be melted with energy levels in the range of 250 to 650 watt second. Using the solder of Pat. '988 with the solder process discussed above, e.g. in Pat. '606, to solder leads to bus bars and/or bus bar strips, can reduce the occurrence and/or magnitude of glass chipping due to localized heating. However, the soldering method of Pat. '988 still requires a separate soldering step to solder the leads to the bus bars. Further, the problem of localized heating still exists when using high temperature melting solders.

As can be appreciated, it would be advantageous to provide a method of soldering or bonding electrical members or components carried on a glass sheet that eliminates the separate soldering step and eliminates localized heating of glass during soldering thereby eliminating damage to the glass sheet, e.g. glass chipping, and to provide an additional solder composition that has a low melting temperature.

SUMMARY OF THE INVENTION

The present invention provides a low temperature melting solder comprising 61-65 weight percent indium, 30-34 weight percent tin and no more than 5 weight percent ingredients other than indium and tin.

Other non-limiting embodiments of the invention include: (a) indium in the range of 62-65 weight percent; tin in the range of 31-33 weight percent, copper in the range of greater than 0 to 1.5 weight percent and silver in the range of 34 weight percent; (b) indium having a weight percent of 63.5; tin having a weight percent of 32; copper having a weight percent of 1.0, and silver having a weight percent of 3.5; (c) indium having a weight percent of 64; tin having a weight percent of 31 and other ingredients having a weight percent of equal to or less than 5, e.g. and not limiting to the invention, the other ingredients include 3.00-4.95 weight percent silver, and 0.25-1.25 weight percent copper.

Still other non-limiting embodiments of the invention include the solder having a liquidus temperature of 119.6° C. and a solidus temperature of 118.6° C.; a difference between the liquidus and solidus temperature of no greater than 5 degrees, and/or a solder composition having a eutectic temperature of no greater than 250° F.

The present invention further provides a method of soldering a connector to an electrically conductive arrangement using a non-limiting embodiment of a solder or a solder composition of the invention. One non-limiting embodiment of the method includes providing a first sheet having a major surface, a peripheral edge and an electrically conductive arrangement on the major surface, and a connector having a first portion and a second portion, the first portion spaced from the second portion. The conductive arrangement includes a preselected contact area with the first portion of the connector over the contact area and a layer of solder provided between the first portion of the connector and the preselected contact area. The solder composition includes 61-65 weight percent indium, 30-34 weight percent tin, and greater than 0 to 5 weight percent ingredients other than indium and tin. A second sheet having a peripheral edge is positioned over the first portion of the connector to provide a subassembly with the second portion of the connector extending beyond the peripheral edge of at least one of the sheets. The subassembly is heated to a temperature greater than the melting temperature of the solder to melt the solder, after which the subassembly is cooled to solidify the solder and provide electrical contact to the conductive arrangement at least through the second portion of the connector.

The present invention still further provides a laminated transparency having a first glass sheet having a desired configuration and periphery; a second glass sheet having a configuration and periphery generally corresponding to the configuration and periphery of the first sheet; an interlayer positioned between the first sheet and second sheet; an electrically conductive member between a major surface of the first sheet and the interlayer, the conductive member being spaced from the periphery of the first sheet so as to provide a conductive are along the periphery of the first sheet; first and second spaced apart metal foil bus bars positioned between the major surface of the first sheet and the interlayer and in electrical contact with the conductive member, wherein a least a portion of the conductive member extends between the first and second bus bars and at least one end of the first bus bar extends into the nonconductive area; an electrically conductive hard-set bus bar extension extending along a portion of the nonconductive area, wherein a first end of the bus bar extension is in electrical contact with the at least one end of the first bus bar; a first lead with a first end in electrical contact with an opposing end of the bus bar extension within the nonconductive area, and a second end extending beyond the periphery of the first sheet; and a second lead with a first end in electrical contact with the second bus bar, and a second end extending beyond the periphery of the first sheet. In one nonlimiting embodiment of the invention, the electrically conductive member is a conductive coating comprising an infrared reflecting film and a dielectric film, and the coating terminates short of an edge of the first sheet to provide a nonconductive area on the marginal edge portions of the first sheet, and at least one end of the ends of at least one bus bar extends into the nonconductive area.

DETAILED DESCRIPTION OF THE INVENTION

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.3, and ending with a maximum value of 10 or less, e.g., 5.5 to 10, and all subranges in between, e.g. 2.7 o 6.1. Also, as used herein, the terms "deposited over", "applied over", or "provided over" mean deposited, applied, or provided on but not necessarily in direct surface contact with. For example, a material "deposited over" a substrate does not preclude the presence of one or more other materials of the same or different composition located between the deposited material and the substrate.

Before discussing several nonlimiting embodiments of the invention, it is understood that the invention is not limited in its application to the details of the particular nonlimiting embodiments shown and discussed herein since the invention is capable of other embodiments. Further the terminology used herein to discuss the invention is for the purpose of description and is not of limitation. Still further, in the following discussion, unless indicated otherwise, like numbers refer to like elements.

In general, the method of the invention relates to, but is not limited to, a solder composition that has a low liquidus temperature such that the heat available during thermal processing of components of an article or the article, e.g. but not limiting to the invention, heating a sheet to shape the sheet or heating a pair of sheets to laminate the sheets, is used to melt the solder. During the cooling of the component or article according to a cooling schedule, the solder solidifies to form a solder joint or bond. By way of illustration, but not limiting to the invention, a sheet to be shaped has an electrically conductive arrangement on a surface, e.g. a conductive coating, bus bars, rain sensor, antenna, control circuit to name a few electrically conductive members. The sheet is heated to its shaping temperature, shaped and cooled. In one nonlimiting embodiment of the invention, after the sheet is shaped, e.g. during cooling of the sheet, a soldered covered ("tinned") end of a lead or connector is positioned on a selected area of the electrically conductive arrangement. The conductive and/or radiant heat of the electrically conductive arrangement and/or sheet melts the solder. When the temperature of the area of the conductive arrangement having the lead drops below the solidus or melting temperature of the solder, a solder joint or bond is made between the end of the lead and the electrically conductive arrangement.

As can be appreciated, in the practice of the invention, the melting temperature, e.g. liquidus temperature, of the solder (a) is preferably below the highest temperature to be attained by the thermal process to which the sheet and conductive member are to be subjected, and preferably below the deterioration temperature of the material of the lead assembly, e.g. sheath or covering over the conductive lead, and (b-1) is preferably above the lowest temperature to which the finished article will experience during use and (b-2) above the lowest temperature of a subsequent thermal process to which the sheet and electrical component having the soldered lead are to be exposed. The temperature requirements of Item (b-2) prevent detachment of the lead during subsequent processing, e.g. soldering a lead during one process and melting the solder during a subsequent process may result in the lead falling off. As can be appreciated, an exception to the foregoing is in those instances where the lead soldered to the electrical component is held in position during the subsequent heating process. By way of illustration, but not limiting to the invention, leads can be soldered to an area of an electrical component during the annealing of a shaped glass sheet. The glass sheet having the lead soldered to the electrical component and another sheet are laminated together. In this case, the autoclaving temperature may be above the melting temperature of the solder because the lead will be held in position between the glass sheets during autoclaving and is expected to remain in position until the solder cools from its liquidus temperature to a temperature below its solidus temperature.

As can now be appreciated, the concern regarding melting the solder joint during subsequent processes can be eliminated by soldering the lead to the electrical arrangement or component during the last thermal process in which the temperature of the electrical arrangement is expected to be above the melting temperature of the solder, or using a solder that has a melting point above the temperature of any subsequent thermal process.

Although not limiting to the invention, in the practice of the invention, the temperature difference between the liquidus temperature, and the solidus temperature, of the solder is no greater than 30 degrees, for example, no greater than 20 degrees, or no greater than 10 degrees, no greater than 5 degrees, in order that the solder solidifies in the shortest time as the temperature drops below the solidus or melting temperature of the solder. In this manner, the probability of misalignment between the lead and the electrical arrangement is minimized and/or the application of a biasing force to maintain the alignment of the lead and electrical arrangement before the solder solidifies is reduced. A solder that has been used in the practice of the invention is disclosed in Pat. '988 assigned on its face to Antaya Technologies of Cranston, R.I. Other solders that can be used in the practice of the invention are proprietary solder compositions of PPG Industries Ohio, Inc. of Delaware, Ohio. In one non-limiting embodiment of the solder of the invention, the solder is a eutectic mixture of 52% by weight indium and 48% by weight tin having a eutectic temperature of 244° F. (118° C.).

In other non-limiting embodiments of the present invention, the low temperature melting solder includes solder compositions having (1) 46-60 weight percent ("wt %") indium and 40-54 wt % tin, (2) 49-55 wt % indium and 45-51 wt % tin, and (3) 51-53 wt % indium and 47-49 wt % tin. Although not required, no more than 5% by weight of the low temperature melting solder composition are ingredients other than indium and tin.

In still another non-limiting embodiment of the present invention, the low temperature melting solder has a eutectic temperature of no greater than 260° F. (127° C.), for example, no greater than 250° F. (121° C.).

In other non limiting embodiments of the invention, the solder composition includes 61-65 wt % indium, 30-34 wt % tin and greater than 0 to 5 wt % of ingredients other than indium and tin (hereinafter also referred to as "miscellaneous metals" or "misc. metals". In one non-limiting embodiment of the invention, the misc. metals and wt % of the misc. metals are as follows: silver 3.00-4.95 wt %; copper 0.25-1.25 wt %; antimony 0-0.750 wt %; gold 0-0.080 wt %; lead 0-0.200 wt %; aluminum 0-0.080 wt %; arsenic 0-0.030 wt %; cadmium 0-0.005 wt %; zinc 0-0.005 wt %; bismuth 0-0.250 wt %; iron 0-0.020 wt %, and nickel 0-0.005 wt %. In another non-limiting embodiment of the invention, the upper limit of the weight percent of antimony, gold, lead, aluminum, arsenic, cadmium, zinc, bismuth, iron or nickel is the maximum weight percent.

As can be appreciated, the weight percent of the indium, tin and misc. metals can vary depending on tramp material in the ingredients. A tramp material is any material that has a weight percent of less than 0.004.

In another non-limiting embodiment of the invention, indium is in the range of 62-65 wt %; tin is in the range of 31-33 wt %; copper is in the range of greater than 0 to 1.5 wt % and silver is in the range of 3-4 wt %. In still another non-limiting solder composition, a tested solder composition discussed below had 63.5 wt % indium; 32 wt % tin; 1 wt % copper and 3.5 wt % silver. The solder composition had a liquidus temperature of 119.6° C. and a solidus temperature of 118.6° C. In still another non-limiting solder composition, the solder composition included 64 wt % indium, 31 wt % tin and 5 wt % misc. metals, e.g. and not limiting to the invention 3.00-4.95 wt % silver, and 0.25-1.25 wt % copper.

It can be appreciated that the total wt % of the solder compositions of the non-limiting embodiments of the invention equal 100 while staying within the ranges provided for the specific solder composition. For example and not limiting to the invention, for the solder composition having 61-65 wt % indium, 30-34 wt % tin and greater than 0 to 5 wt % of ingredients other than indium and tin, the invention contemplates 30 wt % tin, no less 65 wt % indium and up to 5 wt % ingredients other than indium and tin.

In the following discussion, the invention is practiced on vehicular laminated transparencies having an electrical arrangement between a pair of glass sheets or blanks. The electrical arrangement includes a conductive member, e.g. a conductive coating between and in electrical contact with a pair of spaced bus bars. A connector or lead associated with each bus bar provides electrical access to the bus bars. More particularly, each lead has one end extending beyond the peripheral edge of the laminated transparency, and the other end of the lead connected, e.g. soldered to one of the bus bars. As will be appreciated, the invention is not limited thereto, and can be practiced on any laminate that has an internal member responsive to stimuli. Nonlimiting embodiments of transparencies include laminated windows for residential homes, commercial buildings and refrigerator doors having a viewing area. Nonlimiting embodiments of internal members include electrically conductive members that generate heat as current moves through the member, or a thermally or electrically sensitive coating that changes transmittance of wavelengths in the visible, ultraviolet and infrared ranges of the electromagnetic spectrum upon heating or application of current, an electric sensor circuit to activate windshield wipers and antennas to receive and/or send signals. Further, nonlimiting internal members that can be used in the practice of the invention are discussed in U.S. Pat. Nos. 4,401,609; 5,040,411 and 5,066,111; PCT Application US02/06163 filed Feb. 28, 2002, for "Moisture Detection System and Method of Use Thereof"; U.S. Pat. No. 6,535,126 issued Mar. 18, 2003, in the names of Chia Cheng Lin et al. for "Electrochromic Transparency Incorporating Security System"; U.S. patent application Ser. No. 09/591,572 filed Jun. 9, 2000, in the name of C. B. Greenberg for "Electrochromics", now abandoned; and U.S. Pat. No. 6,730,389, issued May. 4, 2004, in the name of C. S. Voeltzel for "Coated Substrate Having a Frequency Selective Surface", which documents are hereby incorporated by reference.

As can be appreciated, although the features of the invention are practiced with a sheet that is used as a sheet of a laminate, the invention is not limited thereto. For example, but not limiting to the invention, the invention can be practiced on sheets that are used as monolithic sheets, e.g. a sheet of a double glazed unit, e.g. of the type disclosed in U.S. Pat. No. 5,655,282, which patent is hereby incorporated by reference.

In the following discussion the vehicular laminated transparency is an automotive windshield; however, the invention is not limited thereto and can be any type of a vehicular transparency such as, but not limiting the invention thereto, an automotive sidelight, e.g. of the type disclosed in European Patent Application No 00936375.5, which document is hereby incorporated by reference, a moon roof and a backlite or rear window. Further, the transparency can be for any type of vehicle, e.g. but not limiting the invention thereto land vehicles such as but not limiting the invention thereto trucks, cars, motorcycles, and/or trains, to air and/or space vehicles, and to above and/or below water vehicles.

Figure 1:
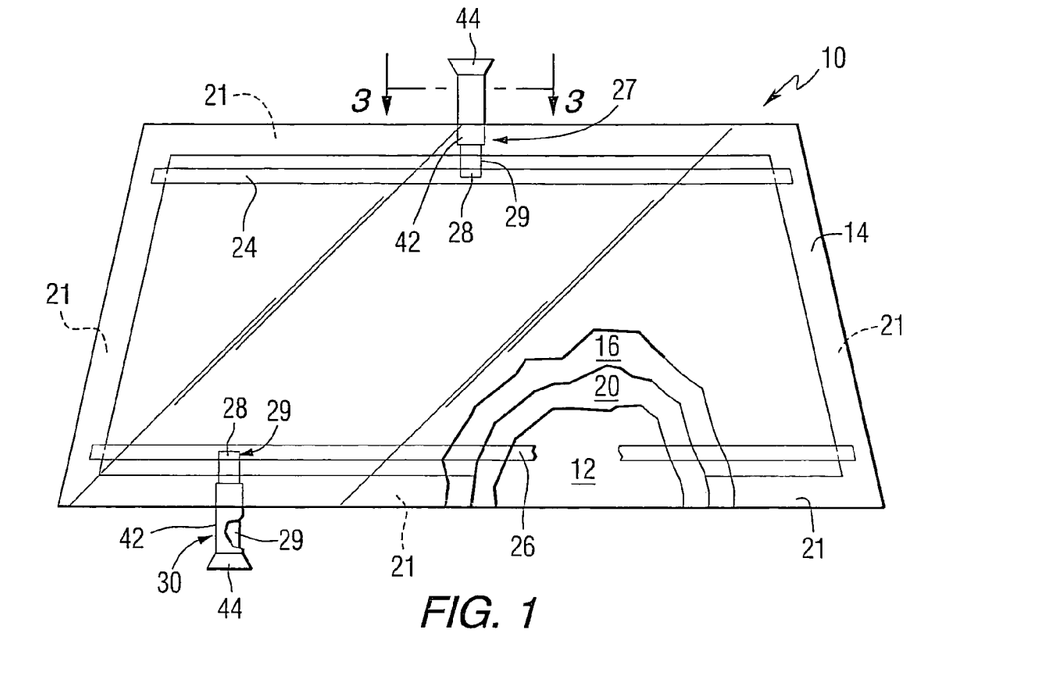
FIG. 1 is a plan view of a laminated automotive windshield incorporating features of the invention and having portions removed for purposes of clarity.

With reference to FIG. 1, there is shown an automotive windshield 10 incorporating features of the invention. The windshield 10 includes a pair of glass sheets or blanks 12 and 14, and an electrically conductive member 16 of an electrical arrangement on inner surface of one of the glass sheets, e.g. surface of the inner blank 14 facing the exterior of the automobile as the windshield is mounted, also referred to as the No. 3 surface of the laminate or windshield. In the following discussion, the member 16 is electrically heated as current moves through the conductive member to heat the outer surface of the outer blank 12 as the windshield is mounted, also referred to as the No. 1 surface of the laminate or windshield, by conduction to remove fog, ice and/or snow, as the case may be. An interlayer or sheet 20 laminates the glass sheets 12 and 14 together. Although the invention is not limited thereto, in the particular embodiment illustrated in FIG. 1 the conductive member 16 is on or against the No. 3 surface of the windshield.

As can be appreciated by those skilled in the art, the invention is not limited to the composition of the glass sheets or blanks 12 and 14, for example and not limited to the invention the glass sheets may be clear or tinted glass, for example, of the type disclosed in U.S. Pat. Nos. 5,030,592; 5,240,886, and 5,593,929, which patents are hereby incorporated by reference. The glass sheets can be annealed, tempered or heat strengthened. The glass sheets can have uniform thickness or can be wedged as viewed in cross section, e.g. as disclosed in U.S. Pat. No. 5,812,332. The glass sheets can be soda-lime-silicate glass or borosilicate glass or any type of refractory glass.

Further, in the practice of the invention, but not limiting thereto, the electrically conductive member 16 can be a continuous coating, or a plurality of spaced conductive elements such as wires, e.g. as discussed in U.S. Pat. No. 5,182,431; or strips of conductive material, e.g. a plurality of discreet spaced areas of conductive coating, e.g. as disclosed in U.S. patent application Ser. No. 10/264,106 filed on Oct. 3, 2002, in the name of Charles S. Voeltzel for "Heatable Article Having a Configured Heating Member" (hereinafter also referred to as "U.S. Ser. No. 10/264,106"), which documents are hereby incorporated by reference. In one nonlimiting embodiment of the invention, the conductive coating 16 includes three dielectric layers, e.g. a layer of an oxide of a tin zinc alloy and/or a zinc oxide film having a metal film usually an infrared reflecting film, e.g. silver, between adjacent dielectric layers. The coating can be of the typed disclosed in European Patent Application No. 00939609.4, which application is hereby incorporated by reference.

The interlayer sheet 20 secures the glass blanks 12 and 14 together as is well known in the art and can be any of the types of interlayer material used in the laminating art to join two substrates, e.g. two transparent sheets such as glass sheets of an automotive transparency. In the case of an automotive transparency, the material of the interlayer sheet can be polyvinyl butyral ("PVB"), polyvinyl chloride ("PVC"), or polyurethane. The interlayer sheet 20 can have a uniform thickness through out its length and width or it can have varying thickness, e.g. as disclosed in U.S. Pat. No. 4,998,784, which patent is hereby incorporated by reference, to provide an interlayer in cross section having one or more wedged portions. The thickness, outer dimensions and configuration of the interlayer sheet 20 are not limiting to the invention; however in the practice of the invention it is preferred that the interlayer sheet 20 have a configuration, area and thickness to laminate the glass sheets 12 and 14 together. Usually after lamination about 1/16 inch (0.16 centimeters ("cm")) of the interlayer sheet extends beyond the peripheral edges of the glass sheets to insure complete lamination of the surfaces of the glass sheets.

Regarding the conductive member 16, it is the normal practice, but not limiting to the invention, when using a vacuum sputtered coating having multiple films or layers to terminate the coating short of the edges of the glass sheet on which it is applied, e.g. short of the edges of the sheet 14 to provide uncoated marginal edge portions or non-conductive strip 21 between the perimeter of the conductive coating and the peripheral edge of the sheet 14 as shown in FIG. 1. This can be accomplished by coating the total surface of the sheet and deleting the coating e.g. as disclosed in U.S. Patent No. 4,587,769 or using a mask during sputtering e.g. as disclosed in U.S. Pat. No. 5,492,750 to provide the non-conductive strip. The disclosures of U.S. Pat. Nos. 4,587,769 and 5,492,750 are hereby incorporated by reference.

The electrically conductive arrangement further includes a pair of spaced bus bars 24 and 26. The coating 16 extends between and is electrically connected to the spaced bus bars, e.g. top or upper bus bar 24 and bottom or lower bus bar 26 as viewed in FIG. 1. The application, dimensions and type of bus bars are not limiting to the invention. For example, the area of the bus bars, e.g. width and thickness of the bus bars should be sufficient to carry the current required to heat the conductive member 16 to heat at least the outer surface, No. 1 surface of the windshield. The voltage and current usually carried by the bus bars to heat an automotive windshield is 42 volts and 31 amperes. In one nonlimiting embodiment of the invention, the bus bars are made of a ceramic conductive paste that is silk screened or screen printed onto the surface of the glass sheet or onto the internal member or coating 16 and subsequently heated to fuse the ingredients of the paste onto the glass or coating. In another nonlimiting embodiment of the invention, the bus bars are made of a conductive strip, e.g. elongated or braded wires or a metal foil e.g. gold, silver, aluminum, or copper foil to name a few metal foils that may be used in the practice of the invention. In the practice of the invention, the use of metal foil bus bars eliminates the screen printing and heating steps. One nonlimiting embodiment of the invention uses copper foil because unlike gold and silver foils, it is inexpensive and unlike aluminum foil, it is non-reactive with most other current conducting materials.

The thickness of the bus bars 24 and 26 is typically equal to eliminate any laminating concerns regarding bus bars of different thicknesses. The width for bus bars having a center feed, e.g. having a lead assembly 27 having an end portion 28 of lead 29 connected to the center portion of the bus bar 24 as shown in FIG. 1 is less than the width for bus bar having an off center feed, e.g. having lead assembly 30 having end portion 28 of the lead 29 connected to the left portion of the bus bar 26 as shown in FIG. 1. For example but not limiting to the invention, bus bars having a thickness of 0.071 millimeters ("mm") typically have a width of 7 millimeters ("mm") when the lead is at the center of the bus bar and a width of 14 mm when the lead is off center. A wider bus bar can be used to increase the cross sectional area of the bus bar when using an off center feed to provide for an even current flow along the extended path of the bus bar. More particularly, current moving through the longer portion of an off center feed bus bar has to travel a longer distance and has more surface of the conductive member to pass current. Therefore, the longer portion of the bus bar having an off center lead, e.g. bus bar 26, should have a greater cross sectional area than a bus bar, e.g. the bus bar 24, having a center lead. Because bus bars of different thickness may cause laminating concerns, it is preferred, although not limiting to the invention to have bus bars of uniform thickness and increase the width of the bus bar to increase its cross sectional area.

The length of the bus bars 24 and 26 is not limiting to the invention and typically is sufficient to extend across the surface of the conductive member 16. In one nonlimiting embodiment of the invention, bus bars 24 and 26 extend into the adjacent non-conductive strips or uncoated areas 21 to minimize or eliminate hot spots as discussed in U.S. patent application Ser. No. 10/201,864 filed on Jul. 24, 2002, in the name of Allen R. Hawk for "Eliminating Hot Spots at End Portions of Bus Bars of a Heatable Transparency Having an Electrically Conductive Member". "Hot spots" as the term is used herein and in the referenced U.S. patent application are areas of the bus bar that are at a temperature higher than the adjacent portions of the bus bar as a result of more current moving through the area than through the adjacent portions of the bus bar.

As can be appreciated, the invention is not limited to the method practiced to apply the bus bar to the glass or to the internal member 16, or to the configuration of the bus bars. A few nonlimiting embodiments of bus bars and bus bar configurations are discussed.

Bus bars that are not structurally stable when applied to the glass sheet or internal member and are made structurally stable during subsequent processing of the sheet (hereinafter such bus bars are referred to as "hard-set bus bars"). For example, but not limiting to the invention, a silver ceramic paste is screen printed onto a glass sheet and/or conductive member, and the ceramic paste is heated during a subsequent heating step to bond it to the glass and/or internal member. Bus bars that are structurally stable (hereinafter referred to as "stable bus bars") are usually fixed against the conductive member 16 during the laminating process.

Figure 2:
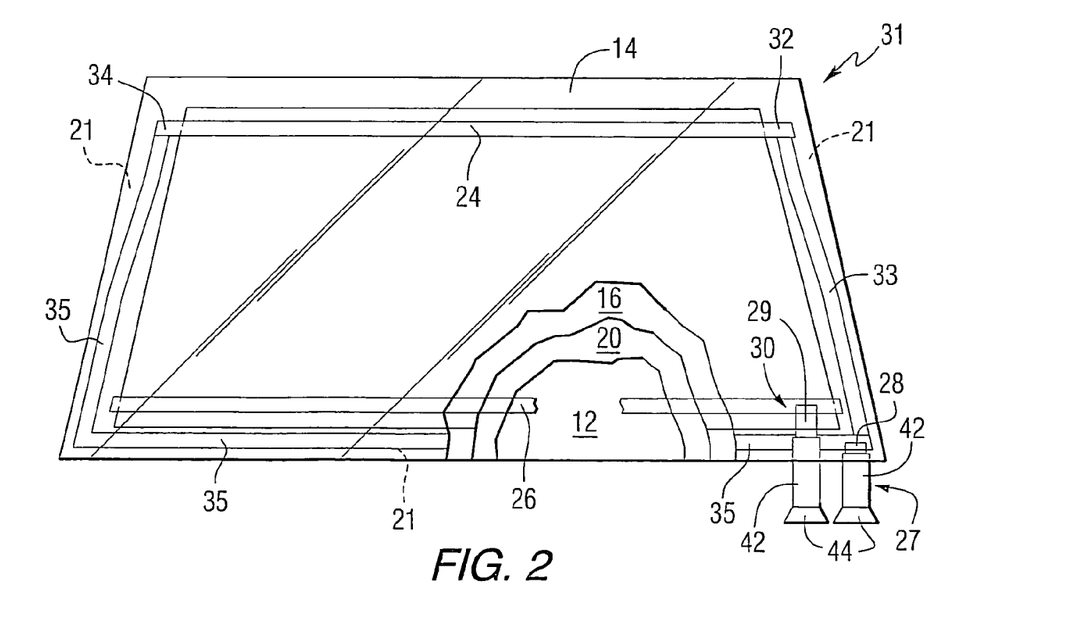
FIG. 2 is a view similar to the view of FIG. 1 and having portions removed for purposes of clarity showing another nonlimiting embodiment of the invention.

As can now be appreciated, one nonlimiting embodiment of the invention contemplates combining structurally stable bus bars and hard-set bus bars. For example but not limiting to the invention, the arrangement of the lead assemblies 27 and 30 shown in FIG. 2 provide external access to the top bus bar 24 and to the bottom bus bar 26 from the same side, e.g. bottom side of laminate 31. As shown in FIG. 2, the stable bus bars, e.g. metal foil bus bars 24 and 26 are in contact with the conductive member 16, with end portion 32 of the top metal foil bus bar 24 in contact with the hard-set bus bar 33 on the non-conductive strip 21. The opposite end portion 34 of the bus bar 24 is in contact with the hard-set bus bar 35 on the non-conductive strip 21 on the opposite side of the conductive member 16. The hard-set bus bar 33 extends from the bus bar 24 toward the right end portion of the bus bar 26 and is electrically isolated from the conductive member 16 and the bus bar 26. The hard-set bus bar 35 extends from the end 34 of the bus bar 24 toward and around the left end portion of the bus bar 26, along the non-conductive strip 21 at the bottom portion of the glass sheet 14 and connects to the end portion of the hard-set bus bar 33 at the right corner of the glass sheet 14 as viewed in FIG. 2. The end portion 28 of the lead 29 of the lead assembly 27 is connected to the juncture of the hard-set bus bars 33 and 35. If desired, bus bars 33 and 35 can remain separate and a first lead assembly can be used to provide power to bus bar 33 and a second lead assembly can be used to provide power to lead 35. The end portion 28 of the lead 29 of the lead assembly 30 is connected to the bus bar 26. As can be appreciated, the bus bars 24, 26, 33 and 35 can all be stable or hard-set bus bars.

The lead assemblies 27 and 30 are not limiting to the invention and can be any of the types used in the art that provide external electrical access to an internal member. With reference to FIG. 1, the lead assemblies 27 and 30 each have the lead 29, e.g. an elongated electrically conductive strip or wire (see FIGS. 1, 3, 4 and 4A) covered with a mechanically durable electrically isolated sheath or sleeve 42. The end portion of the lead 29 of each of the lead assemblies 27 and 30 extending out of the laminate has a connector 44, and the opposite end portion 28 of the lead 29 of the lead assemblies 27 and 30 are soldered in accordance to the teachings of the present invention to the bus bars 24 and 26, respectively. The sheath or sleeve extends up to the connector 44 and terminates short of the end portion 28 of the lead 29 to provide for soldering of the end portion of the lead, e.g. to a bus bar. As can be appreciated, the end portion of the lead of the lead assemblies can be soldered directly to the internal member (direct connection not shown). It should be appreciated that in an embodiment of a windshield 31 of he type shown in FIG. 2 wherein a single lead assembly 27 is used to power both hard-set bus bars 33 and 35, sheath 42 also electrically insulates lead 29 of lead assembly 30 from hard-set bus bar 35.

The material of the lead 29 of the lead assemblies 27 and 30 is not limiting to the invention, e.g. the lead can be a metal foil, a wire or stands of braded wire. In one nonlimiting embodiment of the invention, the electrically conductive lead 29 is made of a metal foil e.g. gold, silver, aluminum, or copper foil to name a few metal foils that can be used in the practice of the invention. In one nonlimiting embodiment, copper foil is used because, unlike gold and silver foils, it is inexpensive and, unlike aluminum foil, it is non-reactive with most other current conducting materials.

The sheath or sleeve 42 over the lead 29 is not limited to the invention and can be made of any material that electrically insulates the lead 29, that is flexible and structurally stable, e.g. flexible without cracking or tearing and that is compatible with the autoclave process for laminating windshields. Non-limiting materials that can be used in the practice of the invention include, plastics, for example but not limited to polyvinyl butyral ("PVB"), polyvinyl chloride ("PVC"), polyurethane and polyamides, for example but not limited to a polyamide of the type sold by Dupont Chemical Company under its trademark KAPTON.

As can be appreciated by those skilled in the art, during the autoclaving, the glass sheets are subjected to elevated temperatures and atmospheric pressure. To prevent air from moving between the glass blanks or sheets, e.g. blanks 12 and 14, during the autoclaving process, the peripheral edges of the sheets and interlayer 20 are pressed to provide a peripheral edge seal around the blanks 12 and 14. As can be appreciated, an air seal or barrier is provided to prevent air from moving around the leads assemblies 27 and 30, and through the components of the lead assembly, e.g. between the surface of the lead 29 and the inner surface of the sheath 42, between the blanks 12 and 14.

Figure 3:
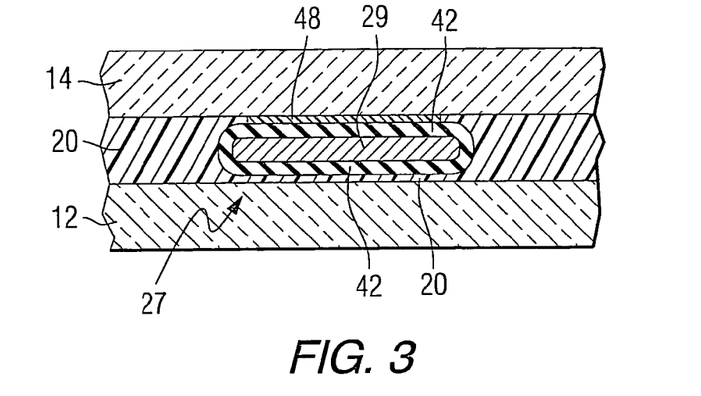
FIG. 3 is a view taken along sectional lines 3-3 of FIG. 1.
Figure 4:
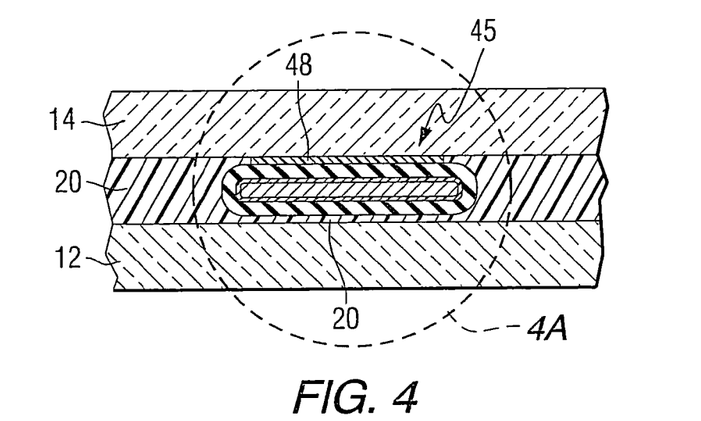
FIG. 4 is a view similar to the view of FIG. 3 having an exploded view (FIG. 4A) showing another nonlimiting embodiment of a lead assembly that can be used in the practice of the invention.
Figure 4A:
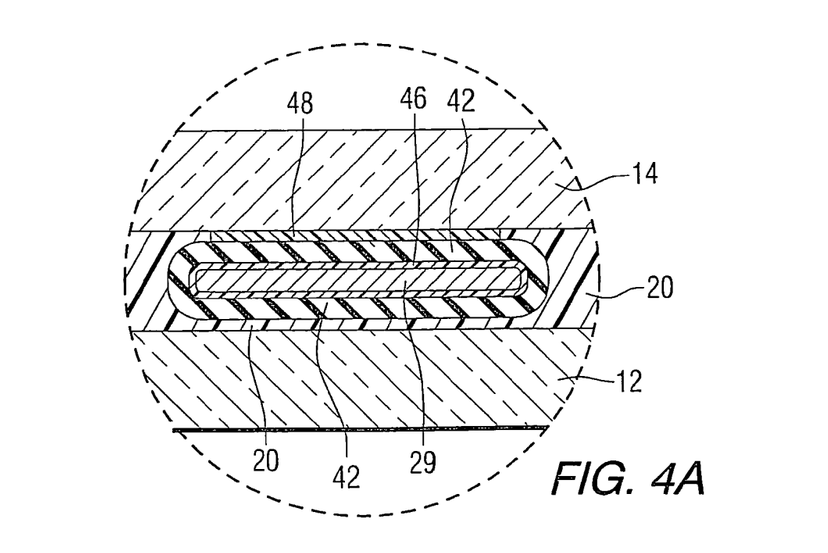

With reference to FIG. 3, there is shown a nonlimiting embodiment of lead assembly 27 to prevent air from moving around and between the components of the lead assembly between the sheets 12 and 14. More particularly, the inner surface of the sheath 42 is adhered to the surfaces of lead 29 as the sheath is formed over the surfaces of the lead. In the instance when the lead 29 and the sheath 42 are formed separately, an air barrier can be provided between the lead 29 and the inner surfaces of the sheath 42 as discussed in U.S. patent application Ser. No. 10/201,863. In general and with reference to FIG. 4, lead assembly 45 includes an adhesive layer 46 between the sheath 42 and the lead 29. A layer 48 of adhesive material is provided between the inner surface of the sheet 14 and adjacent outer surface of the sheath 42. The interlayer sheet 20, which flows over the outer surface portions of the sheath during the edge sealing of the laminate subassembly, seals the remaining surface portion of the outer sheath. The adhesive layers 46 and 48 should be compatible with the materials of the interlayer sheet 20 and the protective sleeve or sheath 42 to prevent the formation of chemical by-products such as gas. Any adhesive that does not deteriorate at the edge sealing and autoclaving temperatures to the extent that it does not prevent the ingress of air, and is compatible with the materials of the laminate, can be used in the practice of the invention. Types of adhesives that can be used for the layers 46 and 48 include but are not limiting to thermal set adhesives, polyvinyl butyral, rubber cement, acrylic adhesives and pressure sensitive adhesives.

In the discussion of the invention, the layers 46 and 48 were discussed as adhesive layers; however, the invention is not limited thereto and any material that reduces or prevents ingress of air between the sheets 12 and 14 in the area of the lead assemblies can be used in the practice of the invention. For example, compressible material held in place by friction can be used. The structural strength of the layers 46 and 48 that make up the air barriers should be sufficient to withstand the pressure forcing air through and around the protective sleeve during edge sealing and autoclaving. The amount of air prevented from flowing around and through the protective sleeve 42 is not limiting to the invention, and the amount of airflow restricted should be sufficient to prevent damage to the laminate, e.g. delamination. In the case of an automotive laminate of the type discussed above, it is preferred, but not limiting to the invention, to maintain the laminate substantially free of air to prevent subsequent delamination of portions the windshield.

Figure 5:
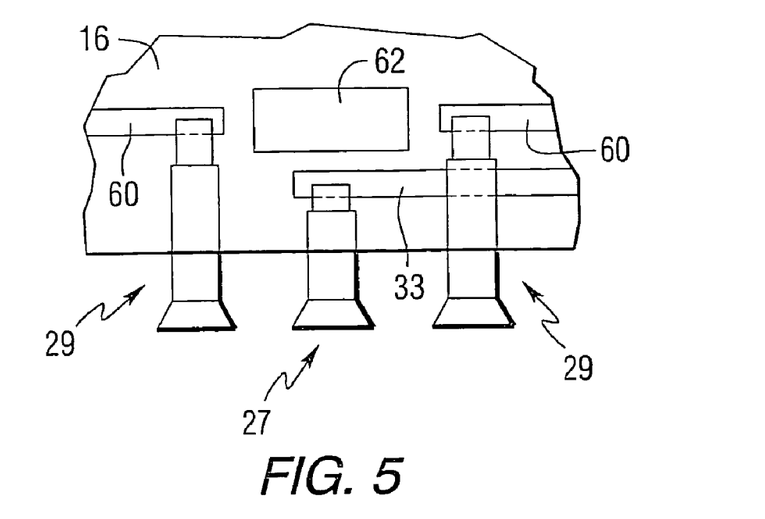
FIG. 5 is a fragmented view showing a connection incorporating features of the invention.

As can be appreciated, the invention is not limited to the configuration of the bus bars and the connections to the lead assemblies. For example, and not limiting to the invention, FIG. 5 shows bus bar 60 with an uncoated area 62 between the segments of the bus bar 60. The hard-set bus bars 33 and 35 connected to the top bus bar 24 (see FIG. 2) meet below the uncoated area 62 within non-conductive area 21. The lead assemblies 30 provide external access to the segments of the bus bar 60, and the lead assembly 27 provides external electrical access to the top bus bar 24 by way of the hard-set bus bars 33 and 35. Referring back to FIG. 5, the uncoated area 62 can be used to pass wavelengths of selected frequencies through the laminate to actuate a device within the car or to electronically read information within the car, e.g. a pass for tollbooths. For a discussion on uncoated areas in a conductive coating references should be had to U.S. Ser. No. 10/264,106.

The following examples will demonstrate nonlimiting embodiments of the invention.

EXAMPLE 1

The invention will be discussed to assemble the components of a nonlimiting embodiment of a windshield incorporating features of the invention. Flat glass pieces to be shaped to provide the glass blanks 12 and 14 are cut from glass sheets, and the edges of the cut pieces are seamed. A conductive ceramic paste is screened printed onto the inner surface of the flat glass piece for blank 14 to provide top bus bar 24 and bottom bus bar 26. A black ceramic paste is screen printed onto the marginal edges (not shown) of the inner surface of the glass piece (the expected No. 2 surface of the laminate) for the blank 12 to provide UV protection for the underlying adhesive securing the windshield in position in the automotive body. The flat glass piece having the bus bars and the flat glass piece having the black ceramic band are heated to a temperature of about 700° F. (371° C.) to fix the bus bars and the blank ceramic band to their respective glass pieces. After the sheet having the ceramic bus bars cools, a continuous heatable coating of the type discussed above is vacuum sputtered on the flat glass piece for the blank 14 between and on the bus bars. A mask is used during the sputtering operation to provide the uncoated marginal area 21 and a void on the bus bars to provide direct contact between the lead and the bus bar. The above-mentioned processes are not limiting to the invention, are well known in the art and will not be discussed in further detail.

The flat glass pieces for the blanks 12 and 14 are heated and individually shaped in any convenient manner, e.g. as disclosed in U.S. Pat. No. 5,656,055. As the blank 14 is cooling during the annealing process, the end portions 28 of the leads of the lead assemblies 27 and 30 covered with a layer of solder having a melting temperature of about 380° F. (193° C.) are positioned on the bus bars at the coating void when the bus bars are above the melting temperature of the solder, and the lead assemblies held in position until the solder solidifies.

After the sheets cool, a layer 48 of a thermoset adhesive, e.g. No. 1500B100 (R/FLEX) supplied by Roger Corporation of Connecticut and purchased from Fralock Company of California, is applied to the outer surface of the sheath 42 of the leads assemblies 27 and 30 to be positioned against the inner surface of the sheet 14. The sheath 42 is formed over the lead therefore not requiring an air barrier between the surfaces of the lead and the inner surfaces of the sheath 42. A PVB sheet 20 is placed between the glass sheets, and the sheets laminated as discussed below in the section titled Laminating Cycle. In the event the temperature, e.g. 380° F (193° C), is too high and may damage the sheath 42, the sheath may be provided as discussed above after the blank cover.

EXAMPLE 2

Figure 6:
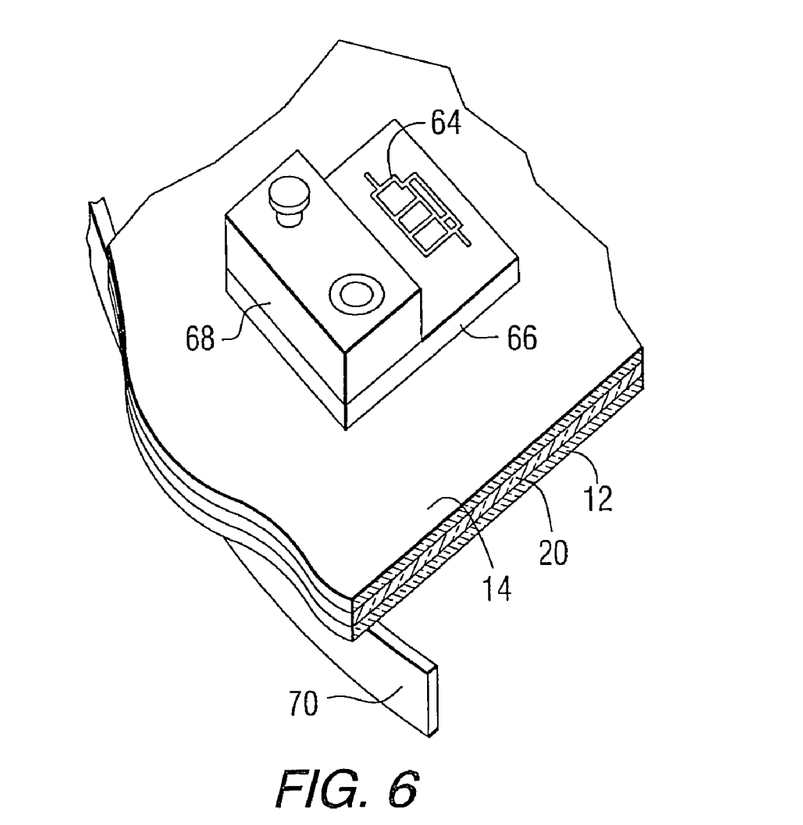
FIG. 6 is a fragmented view of a pair of glass blanks on a bending iron showing an electrical connection incorporating features of the invention on the outer surface of one of the blanks.

The glass blank 12 is provided as discussed above in Example 1. The flat glass piece for the blank 14 is provided as discussed above except ceramic bus bars are not bonded to the glass piece. With reference to FIG. 6, a circuit 64, e.g. an antenna circuit, is applied to expected No. 4 surface of the laminate and a silver ceramic pad 66 is screen printed on the surface in electrical contact with the circuit 64. The flat glass for the blank 14 is heated to bond the pad 66 to the glass. A conductive coating is applied to the inner surface (the expected No. 3 surface of the laminate) of the glass piece for the blank 14 as discussed above. The flat glass pieces for the blank 12 and 14 are stacked on top of one another and positioned on a bending iron 70 of a type well known in the art with the coating and the black ceramic band facing one another.

The bending iron supporting the sheets thereon moves through a tunnel furnace to heat the sheets to their softening temperature. The sheets are shaped on the bending iron and then move through an annealing lehr to anneal the shaped glass sheets. As the blanks 12 and 14 are cooling, connector button 68 (see FIG. 6) having a solder covered bottom surface is positioned on the ceramic pad 66. The solder has a melting temperature of about 380° F. (193° C.). The connector button is positioned on the ceramic pad 66 when the ceramic pad 66 is above the melting temperature of the solder. The connector button is held in position until the solder solidifies. The above-mentioned processes are not limiting to the invention, are well known in the art and will not be discussed in further detail.

An interlayer composite of the type discussed in U.S. Ser. No. 10/201,863 having elongated "I" shaped bus bars, instead of "T" shaped bus bars, is provided. The interlayer composite includes a PVB sheet 20 having a configuration and size to overlay and cover the surface of the sheet 12. An elongated copper foil, e.g. bus bar 24 is secured to the top portion of the sheet 20, and an elongated copper strip, e.g. bus bar 26 is secured to the bottom portion of the sheet 20. The bus bars have a length sufficient to extend across the conductive coating and extend into the non-conductive strip 21 of the sheet 14. The copper foil of each bus bar is secured on the sheet 20 by a strip (not shown) having pressure sensitive adhesive on both surfaces, e.g. an adhesive of the type sold 3M.

The end portion 28 of the lead 29 of each of the lead assemblies 27 and 30 has a layer of solder and is positioned on one of the metal foil bus bars. The solder has a liquidus temperature of about 121° C. and a solidus temperature of about 118.5° C. and is of the type discussed in Pat. '988.

A strip having a pressure sensitive adhesive on both surfaces, e.g. an adhesive of the type sold 3M secures the sheath 42 of the lead assemblies 27 and 30 to the interlayer 20. A layer 48 of a thermoset, e.g. adhesive No. 1500B100 (R/FLEX) supplied by Roger Corporation of Connecticut sold by Fralock Company of California, is applied to the outer surface of the sheaths 42 of the lead assemblies 27 and 30 to engage the inner surface of the sheet 14. The sheath 42 is formed over the lead therefore not requiring an air barrier between the surfaces of the lead and the inner surfaces of the sheath 42.

The composite sheet is positioned on the shaped sheet 14 with the bus bars 24 and 26 in electrical contact with the coating 16, and end portions 28 of the leads 29 of the lead assemblies in contact with their respective hard-set bus bar. The shaped sheet 12 is placed over the plastic sheet 20 of the composite and the sheets are laminated as discussed below in the section titled Laminating Cycle.

For a detailed discussion of the composite interlayer used in Example 2 reference should be made to U.S. Ser. No. 10/201,863.

EXAMPLE 3

The glass blanks 12 and 14 are prepared as discussed in Example 2 except circuit 64 and no ceramic pad 66 is provided on the surface of the blank 14.

The composite sheet of Example 2 is positioned on the shaped sheet 14 with the bus bars in electrical contact with the coating 16 and the lead assemblies in contact with the bus bars. The shaped sheet 12 is placed over the composite 20 as discussed in Example 2, and the sheets are laminated as discussed below in the section titled Laminating Cycle.

EXAMPLE 4

The invention was practiced using ceramic bus bars and the conductive coating as discussed in Example 1 and the sheets shaped as discussed in Examples 2 and 3. A PVB sheet was used to laminate the glass blanks together, and the sheath was formed over the lead. The end portion of the lead positioned over the bus bar was tinned with the solder of USPN '988 having by weight percent:

| | |
|---|---|
| tin | 29.70-30.30 |
| indium | 64.35-65.65 |
| silver | 4.05-4.95 |
| copper | 0.25-0.75. |

This solder is available from Antaya Technologies of Cranston, RI. The sheets were laminated as discussed in the Laminating Cycle. During the laminating cycle, the leads were soldered to their respective bus bar.

Laminating Cycle

A vacuum ring of the type used in the manufacture of laminated windshields was positioned over the periphery of the assembly and a vacuum of 20-28 inches of mercury was pulled. The windshield subassembly having the vacuum applied was place in an oven set at 260° F. (126.7° C.) for 15 minutes to heat the subassembly to a temperature of 225° F. (127.2° C.). While the windshield subassembly was in the oven, the vacuum was continuously pulled through the channel to pull air from between the blanks. The heat and vacuum sealed the marginal edges of the windshield subassembly and for Examples 2 and 3 flowed the adhesive on the ends of the leads. Thereafter the edge sealed windshield subassembly was placed in an air autoclave and laminated. When PVB is used for the interlayer sheet 20, autoclaving will normally take place at a temperature in the range of 135° C. to 150° C., and a pressure of 8 to 15 bars for a period of 15 to 45 minutes. Alternative interlayer materials can be autoclaved in a higher range up to 160° C. or 170° C.

During the laminating cycle, e.g. sealing of the marginal edges of the subassembly and autoclaving, the solder at the ends of leads 29 of lead assemblies 27 and 30 for Examples 2 and 3 melted and solidified adhering to the bus bars.

As can be appreciated by those skilled in the art of laminating, the edge sealing of the subassembly and laminating of the edge sealed subassembly is not limiting to the invention. For example, the subassembly can be sealed using nipper rollers or bagging the subassembly, and the edge sealed subassembly can be laminated by oil autoclaving. Further as can be appreciated, a layer of solder can be positioned between the bus bar and the end portions of the leads instead of covering the end portions of the leads with a solder layer. Still further the end portion of the lead can be positioned on the surface of the bus bar contacting the coating or on the opposite surface of the bus bar.

EXAMPLE 5

In Example 5, samples of one non-limiting embodiment of a solder composition of the instant invention and a commercially available solder were made and the electrical properties (discussed below) measured and compared. The solder composition of the instant invention was 63.5 wt % indium, 32 wt % tin, 1 wt % copper and 3.5 wt percent silver, and had a melting temperature of 119.6° C, a solidus temperature of 118.6° C and a temperature difference between the liquidus and solidus temperatures of 1° C. The commercially available solder was 65 wt % indium, 30 wt % tin, 0.5 wt % copper and 4.5 wt % silver, and had a melting temperature of 121.46° C, a solidus temperature of 118.65° C, and a temperature difference between the liquidus and solidus temperatures of 2.81° C.

Sixty (60) copper strips, each 10 millimeters ("mm") wide, 100 mm long and 0.125 mm thick, were made. Each of the strips had a layer of a polyamide, of the type sold by Dupont Chemical Company under its trademark KAPTON, applied across the width of the strip spaced 20 mm from each end of the strip. The sixty (60) copper strips were randomly divided into three groups of twenty (20) strips; designated Group A, Group B and Group C. The strips of Groups B and C were weighed and a bare end of each strip of Groups B and C were tinned, i.e. coated with a layer of solder. A bare end of the strips of Group B was tinned with the solder composition of the instant invention, and a bare end of the strips of Group C was tinned with the commercial solder. The solder was maintained in the 200 square mm area between the end of the strip and the polyamide. The strips of Groups B and C were weighted after the ends were tinned to determine the weight of solder on each end of the strips. The ends of the Group A strips were free of solder. The weight of the strips of Groups B and C is shown on Table 1 below.

TABLE 1

Weight of strip and solder (in grams) of Groups B and C

| Group B | | | Group C | | |
|---|---|---|---|---|---|
| untinned strip | tinned strip | solder | untinned strip | tinned strip | solder |
| 0.68 | 0.69 | 0.01 | 0.66 | 0.71 | 0.05 |
| 0.65 | 0.67 | 0.02 | 0.65 | 0.73 | 0.08 |
| 0.65 | 0.69 | 0.04 | 0.66 | 0.73 | 0.07 |
| 0.66 | 0.69 | 0.03 | 0.68 | 0.73 | 0.05 |
| 0.65 | 0.69 | 0.04 | 0.65 | 0.71 | 0.06 |
| 0.65 | 0.69 | 0.04 | 0.66 | 0.70 | 0.04 |
| 0.64 | 0.68 | 0.04 | 0.68 | 0.72 | 0.04 |
| 0.64 | 0.68 | 0.04 | 0.68 | 0.72 | 0.04 |
| 0.64 | 0.69 | 0.05 | 0.66 | 0.69 | 0.03 |
| 0.66 | 0.72 | 0.06 | 0.68 | 0.74 | 0.06 |
| 0.67 | 0.68 | 0.01 | 0.67 | 0.73 | 0.06 |
| 0.66 | 0.67 | 0.01 | 0.68 | 0.71 | 0.02 |
| 0.66 | 0.68 | 0.02 | 0.67 | 0.74 | 0.07 |
| 0.66 | 0.69 | 0.03 | 0.68 | 0.71 | 0.03 |
| 0.65 | 0.67 | 0.02 | 0.68 | 0.70 | 0.02 |
| 0.66 | 0.71 | 0.05 | 0.67 | 0.73 | 0.06 |
| 0.65 | 0.68 | 0.03 | 0.67 | 0.72 | 0.05 |
| 0.66 | 0.67 | 0.010 | 0.68 | 0.72 | 0.06 |
| 0.68 | 0.68 | 0.00 | 0.63 | 0.68 | 0.05 |
| 0.67 | 0.71 | 0.04 | 0.68 | 0.69 | 0.01 |

Table 1 shows that the tinned end of the strips of groups B and C each had similar amounts of solder, and therefore any significant variation in measured resistance (discussed below) between the strips would most likely not be the result the amount of solder on the ends of the strips but rather due to the difference in solder composition.

Three glass plates 12 by 12 inches (30.48 by 30.48 cm) each had a pair of spaced lead-free, 84% silver ceramic bus bars screened and fired on a surface, with a side of each bus bar facing and spaced from one another. Five (5) pairs of strips selected from each of the groups were positioned on each of the two silver ceramic fired bus bars. Strips in each pair of strips were positioned at a center to center spacing of 20 mm. The copper strips on the first bus bar were numbered 1 through 10 counting from one end of the first bus bar to the opposite end of the first bus bar, and the copper strips on the second bus bar were numbered 11-20 counting from the first end of the second bus bar to the opposite end, with the strips 1-10 opposite to the strips 11-20.

The sets of copper strips were placed on the first and second bus bars of the three glass plates in the arrangement shown in Table 2 below. More specifically and to further explain the positioning of the test strips on the three sample sheets, strip numbers 1 and 2 and strip numbers 3 and 4 of Group B, making up the first two pairs of strips on Sheet No. 1, were placed on the first bus bar. The remaining three pairs of strips positioned on the first bus bar of Sheet No. 1 were strip numbers 1 and 2 from Group A, and strip numbers 1 and 3 and strip numbers 3 and 4 from Group C. Similarly, the five sets of strips on the second bus bar (in sequence) of Sheet No. 1 were strip numbers 3 and 4 of Group A, strip numbers 5 and 6 from Group C, strip numbers 5 and 6 from Group A, strip numbers 7 and 8 from Group C, strip numbers 5 and 6 from Group B. The strips were positioned in a similar manner on Sheet Nos. 2 and 3 as shown below.

TABLE 2

Position of strips on bus bars of the glass sheets

| Sheet No. 1 | | Sheet No. 2 | | Sheet No. 3 | |
|---|---|---|---|---|---|
| Group | Strip Nos. | Group | Strip Nos. | Group | Strip Nos. |
| First Bus Bar | | First Bus Bar | | First Bus Bar | |
| B | 1 & 2 | B | 7 & 8 | C | 13 & 14 |
| B | 3 & 4 | A | 7 & 8 | B | 15 & 16 |
| A | 1 & 2 | C | 9 & 10 | A | 15 & 16 |
| C | 1 & 2 | B | 9 & 10 | A | 17 & 18 |
| C | 3 & 4 | A | 9 & 10 | C | 15 & 16 |
| Second Bus Bar | | Second Bus Bar | | Second Bus Bar | |
| A | 3 & 4 | C | 11 & 12 | C | 17 & 18 |
| C | 5 & 6 | A | 11 & 12 | C | 19 & 20 |
| A | 5 & 6 | B | 11 & 12 | B | 17 & 18 |
| C | 7 & 8 | B | 13 & 14 | B | 19 & 20 |
| B | 5 & 6 | A | 13 & 14 | A | 19 & 20 |

A sheet of polyvinyl butyral interlayer and a 12 by 12 inch (30.48 by 30.48 cm) glass plate was placed over each glass plate to bias the ends of the strips against the bus bars. The untinned ends of the stripped extended beyond the periphery of the laminates. The three assemblies were placed in an autoclave and heated to 280° F. (137.7° C.) and a pressure of 100 psi (7.031 kg/cm$^2$), practicing an automotive windshield autoclave cycle of the type well know in the art.

After the strips and three assemblies cooled, the resistance between the untinned ends of the strips was measured three times. The measured resistance for the pairs of strips is shown on Table 3.

TABLE 3

Measured direct current resistance in ohms between ends of adjacent strips

| Strip Nos. | Group A | Group B | Group C |
|---|---|---|---|
| 1 to 2 | 0.008 | 0.008 | 0.007 |
|  | 0.008 | 0.008 | 0.008 |
|  | 0.008 | 0.007 | 0.007 |

TABLE 3-continued

Measured direct current resistance in ohms between ends of adjacent strips

| Strip Nos. | Group A | Group B | Group C |
|---|---|---|---|
| 3 to 4 | 0.007 | 0.008 | 0.007 |
|  | 0.009 | 0.008 | 0.008 |
|  | 0.008 | 0.007 | 0.007 |
| 5 to 6 | 0.008 | 0.004 | 0.007 |
|  | 0.008 | 0.007 | 0.008 |
|  | 0.007 | 0.007 | 0.007 |
| 7 to 8 | 0.008 | 0.007 | 0.007 |
|  | 0.009 | 0.007 | 0.008 |
|  | 0.009 | 0.007 | 0.007 |
| 9 to 10 | 0.007 | 0.006 | 0.007 |
|  | 0.008 | 0.007 | 0.008 |
|  | 0.006 | 0.007 | 0.007 |
| 11 to 12 | 0.007 | 0.006 | 0.007 |
|  | 0.007 | 0.008 | 0.008 |
|  | 0.006 | 0.007 | 0.008 |
| 13 to 14 | 0.007 | 0.008 | 0.008 |
|  | 0.008 | 0.007 | 0.008 |
|  | 0.007 | 0.008 | 0.007 |
| 15 to 16 | 0.006 | 0.008 | 0.008 |
|  | 0.007 | 0.01 | 0.008 |
|  | 0.007 | 0.009 | 0.008 |
| 17 to 18 | 0.007 | 0.008 | 0.006 |
|  | 0.007 | 0.008 | 0.008 |
|  | 0.007 | 0.007 | 0.007 |
| 19 to 20 | 0.007 | 0.007 | 0.008 |
|  | 0.008 | 0.008 | 0.008 |
|  | 0.008 | 0.008 | 0.008 |
| Ave. resistance | 0.0075 | 0.0074 | 0.0075 |

From the recorded measurements of Table 3, it can be appreciated that there was no significant difference in the resistance between the strips of Groups B and C.

In the following test, the direct current voltage ("VDC") required to pass 25 amperes ("amps") through the pairs of strips and the resistance in ohms was measured. The measurements are shown on Table 4. This test was conducted to determine if solder joints would pass 25 amps without degrading the solder joint. Group A was tested as a control sample. The passing of 25 amps through the solder joints of Groups B and C did not have any adverse effect.

TABLE 4

VDC required to pass 25 amps though each pair of strips and measured resistance (in ohms)

| Strip Nos. | Group A resistance | Group A VDC @ 25 amps | Group B resistance | Group B VDC @ 25 amps | Group C resistance | Group C VDC @ 25 amps |
|---|---|---|---|---|---|---|
| 1 to 2 | 0.008 | 3.4 | 0.007 | 3.3 | 0.008 | 3.2 |
| 3 to 4 | 0.007 | 3.3 | 0.007 | 3.2 | 0.008 | 3.2 |
| 5 to 6 | 0.008 | 3.4 | 0.007 | 3.1 | 0.004 | 3.2 |
| 7 to 8 | 0.008 | 3.3 | 0.007 | 3.2 | 0.007 | 3.2 |
| 9 to 10 | 0.007 | 3.3 | 0.007 | 3.3 | 0.006 | 3.3 |
| 11 to 12 | 0.007 | 3.2 | 0.007 | 3.3 | 0.006 | 3.1 |
| 13 to 14 | 0.007 | 3.2 | 0.008 | 3.3 | 0.007 | 3.4 |
| 15 to 16 | 0.006 | 3.2 | 0.008 | 3.2 | 0.008 | 3.4 |
| 17 to 18 | 0.007 | 3.3 | 0.006 | 3.2 | 0.008 | 3.3 |
| 19 to 20 | 0.007 | 3.3 | 0.008 | 3.3 | 0.007 | 3.3 |
| Average | 0.0072 | 3.29 | 0.0072 | 3.24 | 0.0069 | 3.26 |

EXAMPLE 6

In this Example 6, twenty (20) strips of the same size as the strips of Example 5 were prepared. An end of each of ten (10) strips was tinned with the Group B solder of the instant invention as described in Example 5 to provide Group D of Example 6, and an end of each of the remaining ten (10) strips was tinned with the Group C commercial solder as described in Example 5 to provide a Group E of Example 6. The weight of each strip before and after tinning was measured.

A glass plate had a pair of spaced silver ceramic bus bars screened and fired on a surface, with a side of each bus bar facing and spaced from one another. The tinned ends of the Group D strips were positioned on one of the two silver ceramic fired bus bars and the tinned ends of the Group E strips were positioned on the other one of the silver ceramic fired bus bars. A glass cover plate (but no interlayer sheet) was placed over the strips and the assembly was subjected to a heating and pressurizing procedure as discussed in Example 5.

After the assembly cooled, the glass cover plate was removed and each of the unsoldered ends of the strips was pulled with a force of 40 Newtons. The pull force was applied along the plane of the bus bar, to evaluate the shear resistance of the soldered joint. The strip passed the test if the soldered joint did not shear. The results of the pull force tests, as well as the weight of each strip, before and after tinning, are shown in Table 5 below.

TABLE 5

Weight of strips (in grams) before and after tinning and results of adhesion test

| Strip | Group D Initial Weight | Group D Soldered Weight | Group D Adhesion to Bus Bar | Group E Initial Weight | Group E Soldered Weight | Group E Adhesion to Bus Bar |
|---|---|---|---|---|---|---|
| 1 | 0.67 | 0.78 | passed | 0.65 | 0.78 | failed |
| 2 | 0.68 | 0.79 | passed | 0.65 | 0.78 | failed |
| 3 | 0.68 | 0.79 | passed | 0.67 | 0.76 | failed |
| 4 | 0.69 | 0.81 | passed | 0.68 | 0.80 | failed |
| 5 | 0.69 | 0.78 | passed | 0.68 | 0.77 | failed |
| 6 | 0.69 | 0.78 | passed | 0.67 | 0.75 | failed |
| 7 | 0.68 | 0.79 | passed | 0.67 | 0.76 | failed |
| 8 | 0.65 | 0.79 | passed | 0.68 | 0.80 | failed |
| 9 | 0.67 | 0.78 | passed | 0.68 | 0.77 | failed |
| 10 | 0.66 | 0.78 | passed | N/A | 0.79 | failed |
| Ave. | 0.676 | 0.787 |  | 0.67 | 0.776 |  |

From Tables 1-5, it can be appreciated that the solder of the instant invention performs as well if not better than presently commercially available low temperature solders.

As can now be appreciated, practicing the invention eliminates a soldering step and eliminates possible thermal damage to the sheet by heating only the portion the sheet to be soldered.

Further, as can be appreciated, the invention contemplates soldering any two components, e.g. soldering two leads or bus bars together, soldering leads to contacts of an antenna, rain sensor, or any other type of electrical device. The invention further contemplates soldering a lead to a contact on a sheet that is used in the manufacture of an insulating glass unit, e.g. of the type disclosed in U.S. Pat. No. 5,655,282.

As can be appreciated, the outer surface of the windshield can be provided with a coating to keep the surface clean such as the type disclosed in U.S. Pat. No. 6,027,766, or a hydrophobic coating of the type sold by PPG Industries, Inc. under the trademark Aquapel and disclosed in U.S. Pat. No. 5,523,162, which patents are hereby incorporated by reference.

The particular embodiments described in detail herein are illustrative only and are not limiting to the scope of the inven-

What is claimed is:

1. A low temperature solder comprising: 62-65 weight percent indium, 31-33 weight percent tin and the remaining ingredients other than indium and tin include at least silver.

2. The solder according to claim 1, wherein the ingredients other than indium and tin and including at least silver comprise:

| | | |
|---|---|---|
| silver | 3.00-4.95 | weight percent, |
| copper | 0.25-1.25 | weight percent, |
| antimony | 0-0.750 | weight percent, |
| gold | 0-0.080 | weight percent, |
| lead | 0-0.200 | weight percent, |
| aluminum | 0-0.080 | weight percent, |
| arsenic | 0-0.030 | weight percent, |
| cadmium | 0-0.005 | weight percent, |
| zinc | 0-0.005 | weight percent, |
| bismuth | 0-0.250 | weight percent, |
| iron | 0-0.020 | weight percent, and |
| nickel | 0-0.005 | weight percent. |

3. The solder according to claim 1, wherein the ingredients other than indium and tin and including at least silver comprise copper in the range of greater than 0 to 1.5 weight percent and silver in the range of 3-4 weight percent.

4. The solder according to claim 3, wherein indium has a weight percent of 63.5; tin has a weight percent of 32; copper has a weight percent of 1.0, and silver has a weight percent of 3.5.

5. The solder according to claim 1, wherein the indium has a weight percent of 64; the tin has a weight percent of 31 and the ingredients other than indium and tin and including at least silver, wherein silver has a weight percent of 5.

6. The solder according to claim 4, wherein the solder has a liquidus temperature of 119.6° C and a solidus temperature of 118.6° C.

7. The solder according to claim 5, wherein the temperature difference between the liquidus and solidus temperatures is 1° C.

8. A method of soldering a connector to an electrically conductive arrangement, comprising:
providing a first sheet having a major surface, a peripheral edge and an electrically conductive arrangement on the major surface, the conductive arrangement comprising a preselected contact area;
providing a connector having a first portion and a second portion, the first portion spaced from the second portion;
positioning the first portion of the connector over the contact area;
providing a layer of solder between the first portion of the connector and the preselected contact area, the solder having a melting temperature, wherein the solder comprises 61-65 weight percent indium, 30-34 weight percent tin and greater than 0 to 5 weight percent ingredients other than indium and tin;
positioning a second sheet having a peripheral edge over the first portion of the connector to provide a subassembly, the second portion of the connector extending beyond the peripheral edge of at least one of the sheets;
heating the subassembly to a temperature greater than the melting temperature of the solder to melt the solder; and
cooling the subassembly to solidify the solder and provide eletrical contact to the conductive arrangement at least through the second portion of the connector.

9. The method according to claim 8, wherein the solder comprises indium in the range of 62-65 weight percent; tin in the range of 31-33 weight percent, and further comprising copper in the range of greater than 0 to 1.5 weight percent and silver in the range of 3-4 weight percent.

10. The method according to claim 9, wherein the solder comprises indium having a weight percent of 63.5; tin having a weight percent of 32; copper having a weight percent of 1.0, and silver having a weight percent of 3.5.

11. The method according to claim 8, wherein the temperature difference between the liquidus and solidus temperatures is 1° C.

12. The method according to claim 11, wherein the solder has a liquidus temperature of 119.6° C and a solidus temperature of 118.6° C.

13. The method according to claim 8, wherein the solder comprises indium having a weight percent of 64; tin having a weight percent of 31, and 5 weight percent of other ingredients.

14. A laminated transparency comprising:
a first glass sheet having a desired configuration and periphery;
a second glass sheet having a configuration and periphery generally corresponding to the configuration and periphery of the first sheet;
an interlayer positioned between the first sheet and second sheet;
an electrically conductive member between a major surface of the first sheet and the interlayer, the conductive member being spaced from the periphery of the first sheet so as to provide a non-conductive area along the periphery of the first sheet;
first and second spaced apart metal foil bus bars positioned between the major surface of the first sheet and the interlayer and in electrical contact with the conductive member, wherein at least a portion of the conductive member extends between the first and second bus bars and at least one end of the first bus bar extends into the nonconductive area;
an electrically conductive hard-set bus bar extension extending along a portion of the nonconductive area, wherein a first end of the bus bar extension is in electrical contact with the at least one end of the first bus bar;
a first lead with a first end in electrical contact with an opposing end of the bus bar extension within the non-conductive area, and a second end extending beyond the periphery of the first sheet; and
a second lead with a first end in electrical contact with the second bus bar, and a second end extending beyond the periphery of the first sheet.

15. The transparency according to claim 14, wherein the first end portion of the second lead is soldered to the second bus bar.

16. The transparency according to claim 15, wherein a bus bar extension has an end portion soldered to the second bus bar and the first end portion of the second lead is soldered to the bus bar extension.

17. The transparency according to claim 14, wherein the second portion of the first and second leads extends from same side of the laminate.

18. The transparency according to claim 14, wherein the transparency is an automotive laminated transparency.

19. The transparency according to claim 14 wherein the electrically conductive member is an electrically conductive coating, a wire, a coating responsive to electric stimuli, and an antenna for receiving and/or sending signals.

20. The low temperature solder according to claim 1, wherein the low temperature solder is adapted for soldering on a glass substrate.

* * * * *